United States Patent [19]

Cowan

[11] Patent Number: 5,097,563
[45] Date of Patent: Mar. 24, 1992

[54] VEHICLE WINDOW CLEANING DEVICE

[76] Inventor: Errol Cowan, 1770 Avon Extended, Charlottesville, Va. 22901

[21] Appl. No.: 659,507

[22] Filed: Feb. 22, 1991

[51] Int. Cl.⁵ .................................................. B60S 1/54
[52] U.S. Cl. .................................... 15/313; 15/250 R
[58] Field of Search ................ 15/313, 250 R, 250.02, 15/250.05

[56] References Cited

U.S. PATENT DOCUMENTS 4,678,224  7/1987  Geppert .......................... 15/313 X

FOREIGN PATENT DOCUMENTS

| 263007 | 4/1988 | European Pat. Off. | 15/313 |
| 2338597 | 2/1975 | Fed. Rep. of Germany | 15/313 |
| 1468407 | 12/1966 | France | 15/313 |
| 8739 | 1/1981 | Japan | 15/313 |
| 39942 | 4/1981 | Japan | 15/313 |
| 8139 | 1/1985 | Japan | 15/313 |
| 71745 | 4/1987 | Japan | 15/313 |
| 269761 | 11/1988 | Japan | 15/313 |
| 24248 | 1/1990 | Japan | 15/313 |

Primary Examiner—Chris K. Moore
Attorney, Agent, or Firm—Walter F. Wessendorf, Jr.

[57] ABSTRACT

The vehicle window cleaning device totally replaces the windshield wiper system. A combined housing houses an electrically powered blower and heater. The housing is ducted to air nozzles disposed below the windshield's bottom. Blower-forced air from the housing through the air nozzles impacts the entire windshield exterior with tremendous force to clean such surface by instantly blowing away dirt, water and moisture. High-temperature air heated by the heater and blower-forced through the air nozzles likewise impacts, melts and blows away ice, ice-encrusted snow and snow from the windshield's exterior surface and cleans such surface by blowing away dirt, water and moisture.

15 Claims, 3 Drawing Sheets

VEHICLE WINDOW CLEANING DEVICE

BACKGROUND OF THE INVENTION

1. Technical Field

This invention relates to a vehicle window cleaning device. The device replaces the winshield wipers and functions to clean, deice, render clear, and maintain clear, the exterior surface of a vehicle's winshield.

2. Background

Oscillating windshield wipers have a number of problems which cause obstructed or impaired windshield vision. With an icedover exterior windshield, the wipers are worthless in attempting to clear the windshield until the ice or snow on the exterior surface of the windshield has been melted. However, even with such ice or snow melted, the oscillating wiper blades will serve to glaze over the windshield with ice in the event the windchill factor, per se, is below freezing, or in the event the wind-chill factor, aggravated by the vehicle's forward speed, is below freezing. Even assuming the exterior surface of the windshield is clean and clear, the very action of the oscillating windshield wiper arms moving back and forth impairs or interferes with the driver's clear vision. Worn wiper blades are ineffective in cleaning water, moisture and dirt from the windshield's exterior surface and, as such, can neither render clear, let alone maintain clear, the exterior surface of the windshield. And, regardless of the condition of the wiper blade arms, the oscillating blade arms eventually wear annular grooves into the exterior surface of the windshield. Such annular grooves are permanent, impair the driver's vision, and, during nighttime driving, the headlights from oncoming vehicles aggravate the impairment of the driver's vision. In addition to vision obstruction and impairment problems caused by ice, ice-encrusted snow and snow on the exterior surface of the windshield, dirt, collected water, water deposited from rainfall and moisture on the exterior surface of the windshield further obstruct or otherwise impair the driver's vision. As sometimes happens, a driver will be driving his vehicle on the highway with the winshield clean and clear. Then, suddenly, a mile down the road, the driver runs into a sudden downfall or cloudburst with his vision totally obstructed by deluges of rain and water.

SUMMARY OF THE INVENTION

Accordingly, the objects of the invention are to contribute to the solution of the discussed problems of the art by providing a vehicle window cleaning device which replaces the windshield wipers. High-speed blower means, with high-impact exhaust air velocity, ducted to air nozzles, remove water, rain, moisture and dirt from the exterior surface of a vehicle's windshield, clean the windshield surface, render the windshield surface clear, and maintain the windshield surface clear, whether the vehicle is stationary or moving. High-temperature heater means, combined with the high-speed blower means, melt all ice, ice-encrusted snow and/or snow on the exterior surface of the windshield, and thereupon remove any water, moisture and dirt remaining on the exterior surface of the winshield, clean the winshield surface, render the winshield surface clear, and maintain the windshield surface clear. In an embodiment of the invention, not only are the high-speed blower means and high-temperature heater means operatively disposed relative to the exterior surface of the windshield, but also relative to the exterior surfaces of the right-side front and rear windows, left-side front and rear windows, and rear windows. In all invention embodiments the high-speed blower means and high-temperature heater means are electrically powered by the vehicle's electrical system and are switch-controlled.

BRIEF DESCRIPTION OF THE DRAWINGS

These objects and other objects of the invention should be discerned and appreciated by reference to the drawings figures, wherein like reference numerals refer to similar parts throughout the several views, in which.

and

Figure 7:
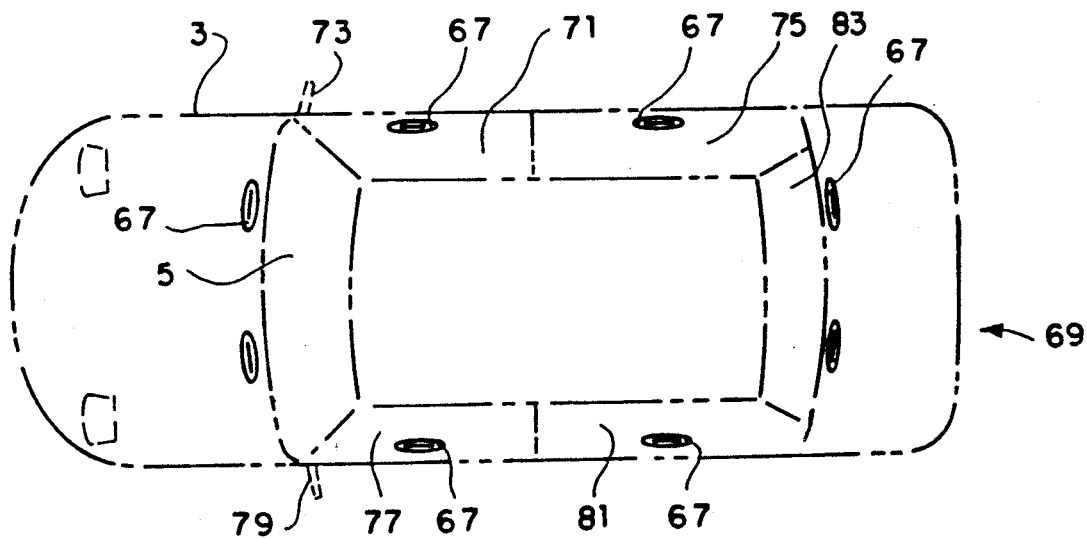

FIG. 7 is a plan view of the fifth embodiment of the invention

DETAILED DESCRIPTIONS OF THE PREFERRED EMBODIMENTS

Figure 1:
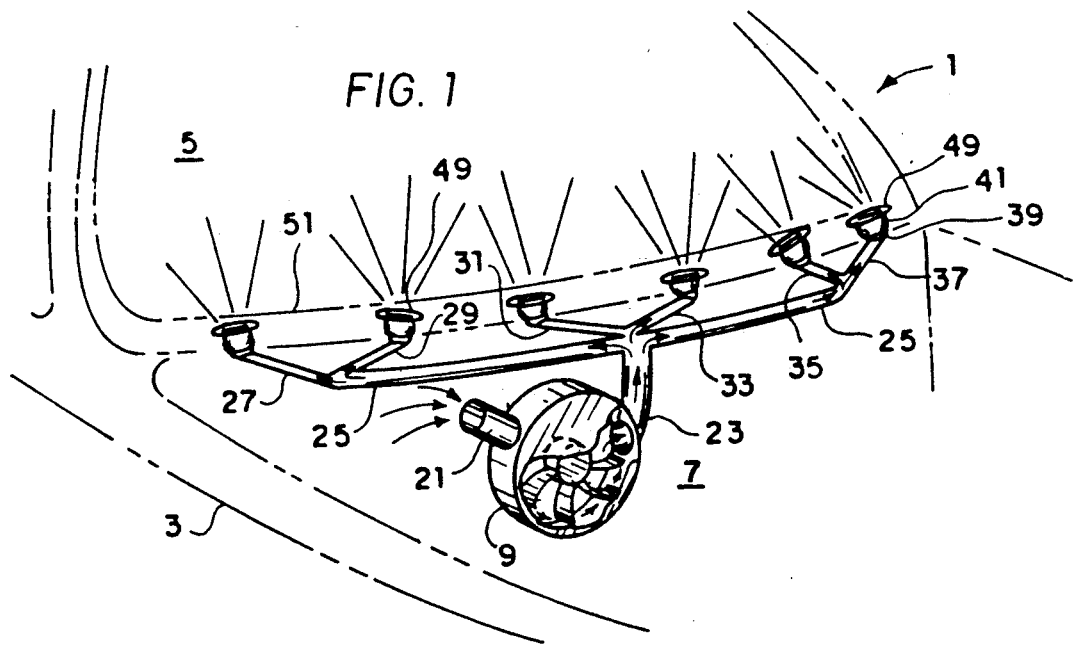
FIG. 1 is a perspective view of the first embodiment of the invention.
Figure 5:
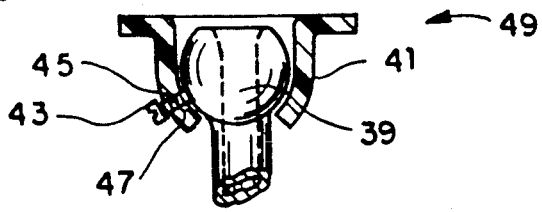
FIG. 5 is a sectional view of the swivel-joint adjustable directional air nozzle employed in the first embodiment of the invention.
Figure 6:
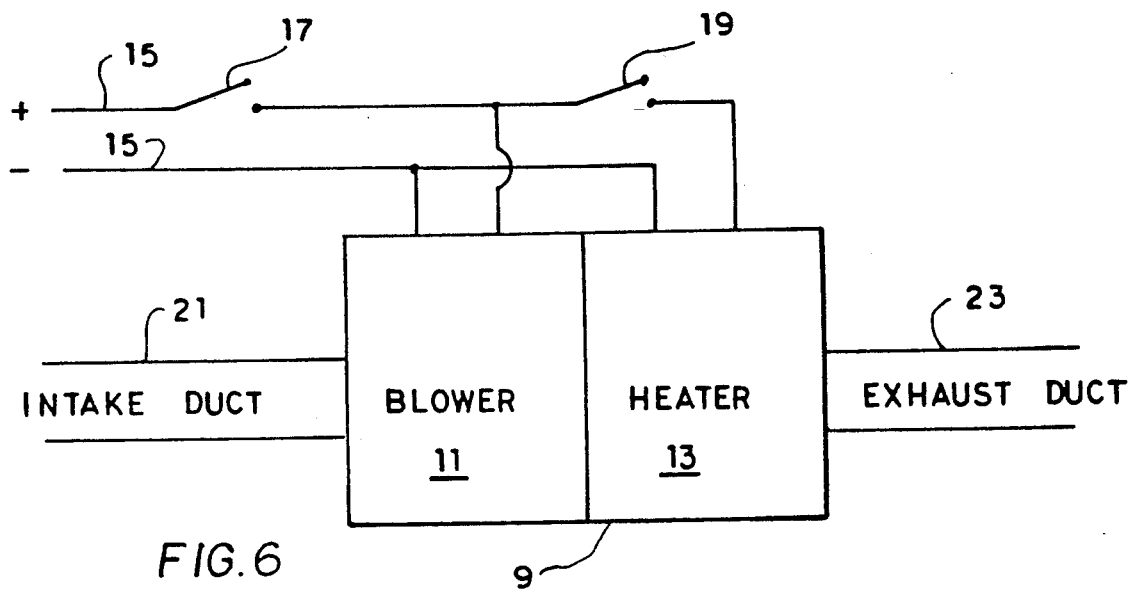
FIG. 6 is a block diagram of the combined, electrically powered high-speed blower and high-temperature heater employed in all the embodiments of the invention.

In FIG. 1 of the drawings, reference numeral 1 generally refers to the first embodiment of the invention. Shown in phantom lines are the vehicle 3, windshield 5 and the firewall 7 of the engine compartment. The housing 9 for the combined high-speed blower 11 and high-temperature electrical heater 13 is appropriately mounted in fixed relationship on the firewall 7. The blower 11 and heater 13 are electrically powered and have leads 15 operatively connected to the vehicle's electrical system. Switches 17 and 19 control the blower 11 and heater 13, respectively. The switches 17 and 19 are appropriately located on the vehicle's dash for the driver's access and convenience. While the blower 11 is operated independently of the heater 13 by closing blower switch 17, the blower switch 17 must be closed in order to operate the heater 13 by closing the switch 19 to complete the circuit to the heater 13. The high-speed blower 11 must produce a wind velocity within the range of 120-200 MPH. The high-temperature heater must produce a temperature within the range of 120°-150° F. An air intake duct 21 communicates directly with the combined blower-heater housing 9; and an exhaust duct 23 communicates directly with the combined blower-heater housing 9. Upon closing the blower switch 17, ambient air from the engine compartment is drawn into the housing 9 and forced therefrom by the blower 11 at high velocity through the exhaust duct 23. When the heater switch 19 is closed as well, ambient air drawn through the intake duct 21 into the combined blower-heater housing 9 will be heated by the high-temperature electrical heater 13 to a high temperature and forced from the housing 9 through the exhaust duct 23. The exhaust duct 23 communicates directly with an exhaust manifold 25 which has six manifold branches 27, 29, 31, 33, 35 and 37 in direct communication with the manifold 25. Each of the terminal ends 39 of the manifold branches 27, 29, 31, 33, 35 and 37 is in the configuration of and thereby defines a sphere having removed therefrom a segment with one base, the base being, as shown in FIG. 5, where the air passage c. Each of the terminal ends 39 freely and complementally mounts a directional air jet 41, defining a swivel-joint relationship. A locking screw 43, whose threaded shank portion 45 is appropriately engaged with a transverse tapped hole 47 in air jet 41, locks the air jet 41 in its discrete directional position where same is disposed relative to its terminal end 39 by sufficient tightening of the locking screw 43. The air jets 41 together with their terminal ends 39 define air nozzles 49. The air nozzles 49 are disposed below the bottom 51 of the windshield 5 with their directional air jets 41 appropriately positioned and adjustably disposed so that the ambient air, forced by the high-speed blower 11 through the exhaust duct 23, exhaust manifold 25, manifold branches 27, 29, 31, 33, 35 and 37, and their respective air nozzles 49, will be directed upon and will impact the entire exterior surface of the windshield 5 with such tremendous force that all dirt on the exterior surface of the winshield 5, all collected water on the exterior surface of the windshield 5, all water deposited on the exterior surface of the windshield 5 from rainfall and all moisture on the exterior surface of the windshield 5 will be instantly removed by being blown away from the exterior surface of the windshield 5, with the desired result that the windshield exterior will be cleaned, rendered clear and maintained clear removing any prior obstruction to or impairment of the driver's vision. When the exterior surface of the windshield 5 is covered with ice, ice-encrusted snow and/or snow, both the blower switch 17 and heater switch 19 are closed causing ambient air to be drawn through the intake duct 21 by the blower 11, to be heated by the high-temperature heater 13 in the combined blower-heater housing 9 and to be forced through the exhaust duct 23, exhaust manifold 25, manifold branches 27, 29, 31, 33, 35 and 37, and their respective air nozzles 49. Such heated air will impact the entire exterior surface of the windshield 5, melt and blow away all ice, ice-encrusted snow and/or snow from the entire exterior surface of the windshield 5, followed instantly by all dirt and remaining moisture being instantly removed by being blown away as well from the entire exterior surface of the windshield 5, with the desired result that the windshield exterior surface will be cleaned, rendered clear and maintained clear.

Figure 2:
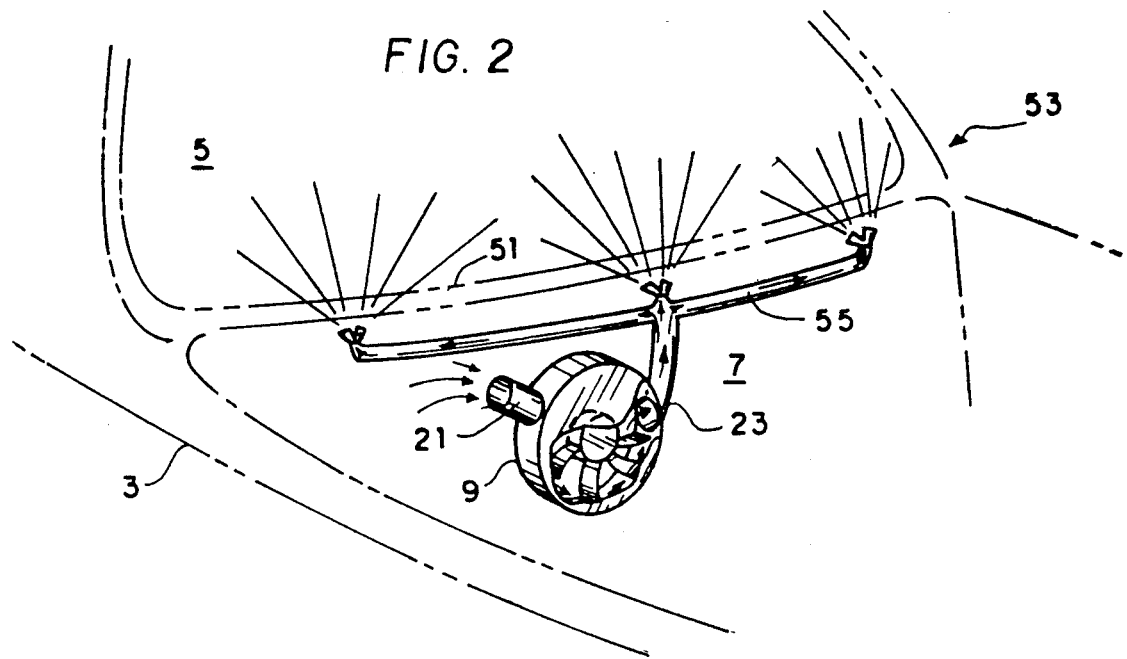
FIG. 2 is a perspective view of the second embodiment of the invention.

The second embodiment of the invention, generally referred to by reference numeral 53 in FIG. 2, utilizes the same structure of the combined blower-heater housing 9, high-speed blower 11, high-temperature heater 13, intake duct 21 and exhaust duct 23, shown and described in FIG. 1. In the second invention embodiment 53, the exhaust duct 23 communicates directly with an exhaust manifold 55 that communicates directly with upstanding bifurcated slits or slot-formed air nozzles 57, disposed below the bottom 51 of the windshield 5 and positioned so that the ambient air forced by the high-speed blower 11 will be directed upon and will impact the entire exterior surface of the windshield 5. The function of the second invention embodiment 53 is similar to the function of the first invention embodiment in melting and blowing away all ice, ice-encrusted snow and/or snow from the entire exterior surface of the windshield 5, followed instantly by all dirt and remaining moisture being instantly removed by being blown away as well as from the entire exterior surface of the windshield 5, with the desired result that the windshield exterior surface will be cleaned, rendered clear and maintained clear.

With respect to the first invention embodiment 1, the functional results obtained when only the blower switch 17 is closed may be referred to as the first mode; and, with respect to the first invention embodiment, the functional results obtained when both the blower and heater switches 17 and 19 are closed may be referred to as the second mode. Thus, it should be discerned and appreciated that when both the first invention embodiment 1 and second invention embodiment 53 are in their first mode the functional results obtained are similar; and that when both the first invention embodiment 1 and the second invention embodiment 53 are in their second mode the functional results obtained are similar.

Figure 3:
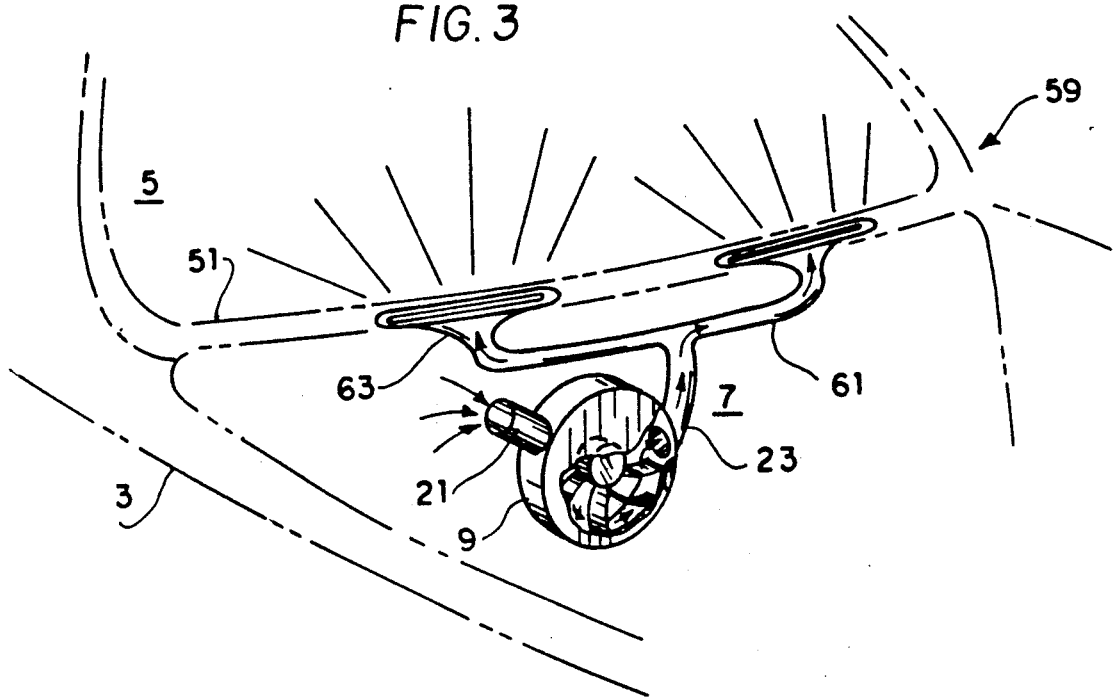
FIG. 3 is a perspective view of the third embodiment of the invention.

The third embodiment of the invention, generally referred to by reference numeral 59 in FIG. 3, utilizes the same structure of the combined blower-heater housing 9, high-speed blower 11, high-temperature heater 13, intake duct 21 and exhaust duct 23, shown and described in FIG. 1. In the third invention embodiment 59, the exhaust duct 23 communicates directly with an exhaust manifold 61 that communicates directly with two upstanding elongated slits or slot-formed air nozzles 63, disposed below the bottom 51 of the windshield 5 and positioned so that the ambient air forced by the high-speed blower 11 will be directed upon and impact the entire exterior surface of the windshield 5. When the blower switch 17 in the third invention embodiment 59 is closed, the third invention embodiment 59 is in its first mode with the functional results obtained that are similar to the functional results obtained when the first invention embodiment 1 is in its first mode. When both the blower and heater switches 17 and 19 in the third invention embodiment are closed, the third invention embodiment is in its second mode with the functional results obtained that are similar to the functional results obtained when the first invention embodiment 1 is in its second mode.

Figure 4:
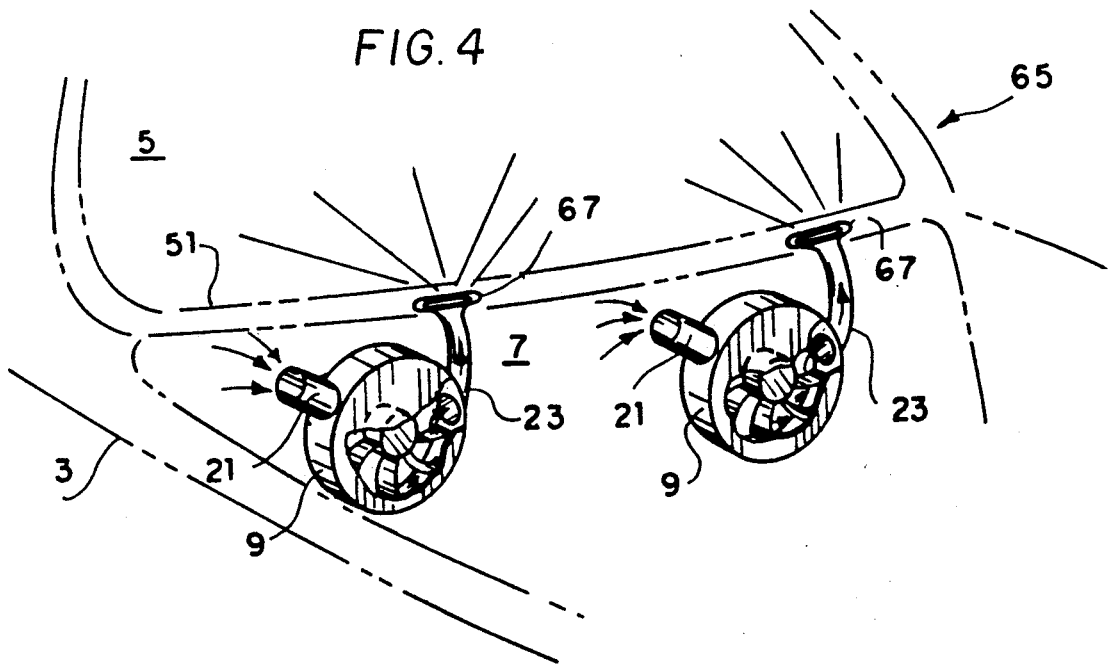
FIG. 4 is a perspective view of the fourth embodiment of the invention.

The fourth embodiment of the invention, generally referred to by reference numeral 65 in FIG. 4, utilizes the same structure of the combined blower-heater housing 9, high-speed blower 11, high-temperature heater 13, intake duct 21 and exhaust duct 23, shown and described in FIG. 1. In the fourth invention embodiment 65, however, two combined blower-heater housings 9 are utilized, each having a high-speed blower 11, high-temperature heater 13, intake duct 21 and exhaust duct 23, for each side of the windshield 5. In the fourth invention embodiment 65, each of the exhaust ducts 23 terminates in an upstanding elongated slit or slot-formed air nozzle 67. As shown, the two air nozzles 67 are disposed below the bottom of the windshield 5 and are positioned so that the ambient air forced by their respective high-speed blowers 11 will be directed upon and impact the entire exterior surface of the windshield 5. When the two blower switches 17 in the fourth invention embodiment 65 are closed, the fourth invention embodiment 65 is in its first mode with the functional results obtained that are similar to the functional results obtained when the first invention embodiment 1 is in its first mode. When both of the two blower switches 17 and the two heater switches 19 in the fourth invention embodiment are closed, the fourth invention embodiment 65 is in its second mode with the functional results obtained that are similar to the functional results obtained when the first invention embodiment 1 is in its second mode.

The fifth embodiment of the invention, generally referred to by reference numeral 69 in FIG. 7, shows the vehicle 3 with its windshield 5, right-side window 71 with its right-side mirror 73, right-side rear window 75, left side front window 77 with its left-side mirror 79, left-side rear window 81 and rear window 83. Two upstanding nozzles 67, both of which are disposed below the bottom of the winshield 5, are positioned, as shown, so that ambient air forced by their respective high-speed blowers 11 will be directed upon and will impact the entire exterior surface of the windshield 5. One upstanding nozzle 67 is disposed below the bottom of the right-side front window 71 and is positioned, as shown, so that ambient air forced by its high-speed blower 11 will be directed upon and will impact the entire exterior surface of the right-side front window 71, along with such ambient air being directed upon and impacting the right-side mirror 73. One upstanding nozzle 67 is disposed below the bottom of the right-side rear window 75 and is positioned so that ambient air forced by its high-speed blower 11 will be directed upon and will impact the entire exterior surface of the right-side rear window 75. One upstanding nozzle 67 is disposed below the bottom of the left-side front window 77 and is positioned, as shown, so that ambient air forced by its high-speed blower 11 will be directed upon and will impact the entire exterior surface of the left-side front window, along with such ambient air being directed upon and impacting the left-side mirror 79. One upstanding nozzle 67 is disposed below the bottom of the left-side rear window 81 and is positioned, as shown, so that ambient air forced by its high-speed blower 11 will be directed upon and will impact the entire exterior surface of the left-side rear window 81. Two upstanding nozzles 67 are disposed below the bottom of the rear window 83 and are positioned, as shown, so that ambient air forced by their high-speed blowers 11 will be directed upon and will impact the entire exterior surface of the rear window 83. Each of the foregoing nozzles 67 utilizes the same structure of the combined blower-heater housing 9, high-speed blower 11, high-temperature heater 13, intake duct 21 and exhaust duct 23, shown and described in FIG. 4 with reference to the fourth invention embodiment 65. The two combined blower-heater housings 9 for the windshield 5 in this fifth invention embodiment 69 are similarly mounted on the firewall of the engine compartment; only one of the combined blower-heater housings 9, however, is utilized for the right-side front window 71 and is appropriately mounted on the support structure within the conventional door envelope for the right-side front window 71; only one of the combined blower-heater housing 9, however, is utilized for the right-side rear window 75 and is appropriately mounted on the support structure within the conventional door envelope for the right-side rear window 75; only one of the combined blower-heater housings 9, however, is utilized for the left-side front window 77 and is appropriately mounted on the support structure within the conventional door envelope for the left-side front window 77; only one of the combined blower-heater housings 8, however, is utilized for the left-side rear window 81 and is appropriately mounted on the support structure within the conventional envelope for for the left-side rear window 81; and the two combined blower-heater housings 9 for the rear window 83 are appropriately mounted on the support structure within the vehicle's rear compartment. The blower and heater switches 17 and 19 are appropriately located on the vehicle's dash for the driver's access and convenience. Upon closing the blower switches 17, ambient air forced by the the high-speed blowers 11 through the nozzles 67 will impact the exterior surfaces of the windshield, side windows, rear window and side mirrors with such tremendous force that all dirt, collected or deposited water or moisture thereon will be instantly removed by being blown away, with the desired results that the windshield, side windows, rear window and side mirrors will be cleaned, rendered clear and maintained clear. And upon all the blower and heat switches 17 and 19 being closed, all ice, encrusted snow and/or snow will be melted and thereafter removed by being blow away from the windshield, side windows, rear window and side mirrors, followed instantly by all dirt and remaining moisture being removed by being blown away, as well as the winshield, side windows, rear window and side mirrors being cleaned, rendered clear and maintained clear.

I claim:

1. A vehicle window cleaning device in combination with a vehicle having an electrical system, a windshield having an exterior surface and a bottom, said cleaning device comprising: electrically powered high-speed blower means, operatively connected to the vehicle's electrical system and operable at high speed without regard to whether the vehicle is stationary, idling or moving, for drawing ambient air and forcing out the ambient air at high velocity; electrically powered high-temperature heater means, electrically connected to the vehicle's electrical system and operable in conjunction with said high-speed blower means, for electrically heating to a high temperature the ambient air drawn and forced out by said blower means; combined blower-heater housing means housing said high-speed blower means and said high-temperature heater means, said housing means having, in communicative relationship therewith, air intake duct means and exhaust air duct means; said blower means drawing ambient air through said air intake means and into said housing means, and forcing the air at high velocity through said exhaust air duct means; air nozzle means, in communicative relationship with said exhaust air duct means, and being disposed below the bottom of the windshield and being positioned relative to the exterior surface of the windshield, for directing and impacting the air, drawn by said blower means through said air intake duct means into said housing means and forced at high impact velocity through said exhaust air duct means and out of said air nozzle means, and directing, with high impact velocity, the forced air with tremendous force upon the entire exterior surface of the windshield to remove instantly, by blowing away, dirt, water and moisture from the entire exterior surface of the windshield and thereby cleaning, rendering clear and maintaining clear the entire exterior surface of the windshield; and said heater means, when operating in conjunction with said blower means, heating to a high temperature within said blower-heater housing means the air drawn into said housing means and so forced from said exhaust air duct means, without regard to whether the vehicle is stationary, idling or moving, such that the air, so heated to such high temperature and directed by said air nozzle means at high impact velocity upon the entire exterior surface of the windshield, impacts, melts and blows away ice, ice-encrusted snow and snow from the entire exterior surface of the windshield, and removes, by blowing away dirt, water and moisture from the entire exterior surface of the windshield, and thereby cleans, renders clear and maintains clear the entire exterior surface of the windshield.

2. A vehicle window cleaning device in accordance with claim 1, wherein is further provided blower-means electrical circuitry operatively establishing electrical continuity from the vehicle's electrical system to said blower means to operate said blower means, and wherein is further provided a blower switch, inline with said blower-means circuitry, to close or open the blower-means circuitry from the vehicle's electrical system to said blower means.

3. A vehicle window cleaning device in accordance with claim 2, wherein is further provided heater-means circuitry operatively establishing electrical continuity from the vehicle's electrical system through said blower-means circuitry to said heater means to operate said heater means only when said blower switch is closed, and wherein is further provided a heater switch, inline with said heater-means circuitry, to close or open said said heater-means circuitry to said heater means.

4. A vehicle window cleaning device in accordance with claim 1, wherein the air forced by the blower means from said exhaust air duct means ranges in velocity from 120-200 MPH.

5. A vehicle window cleaning device in accordance with claim 1, wherein the temperature of the air heated by said heater means ranges from 120°-150° F.

6. A vehicle window cleaning device in accordance with claim 1, wherein are further provided an exhaust manifold and manifold branches, wherein said exhaust manifold is interposed between said exhaust air duct means and said manifold branches, wherein said exhaust manifold communicates with said exhaust air duct means and said manifold branches, wherein said manifold branches have terminal ends, wherein said air nozzle means have directional air jets, wherein said terminal ends carry said air jets, and wherein said air jets are positioned to direct upon the entire exterior surface of the windshield the high impact velocity air forced by said blower means.

7. A vehicle window cleaning device in accordance with claim 6, wherein said terminal ends of said manifold branches and air jets have cooperating mounting means for swivel-joint mounting relationship of said air jets with respect to said terminal ends to afford positionable adjustability for said air jets relative to the entire exterior surface of the windshield.

8. A vehicle window cleaning device in accordance with claim 7, wherein each of said terminal ends of said manifold branches is configured and defines a sphere having removed therefrom a segment with one base.

9. A vehicle window cleaning device in accordance with claim 8, wherein each of said terminal ends and its air jet associated therewith have cooperating locking means to lock said air jet in a discrete position of orientation relative to its said associated terminal end and positioning relative to the exterior surface of the windshield.

10. A vehicle window cleaning device in accordance with claim 6, wherein each of said air jets is bifurcated.

11. A vehicle window cleaning device in accordance with claim 6, wherein each of said air jets defines an elongated slot.

12. A vehicle window cleaning device in accordance with claim 1, wherein said blower means comprise two blowers, wherein said heater means comprise two heaters, wherein said housing means comprise two housing, wherein said air intake duct means comprise two air intake ducts, wherein said exhaust air duct means comprise two exhaust air ducts, wherein said air nozzle means comprise two air jets, wherein each of said air jets defines an elongated slot, wherein each of said housings houses a blower and a heater, has an air intake duct and an exhaust air duct in communicative relationship therewith, and wherein each exhaust air duct communicates with one of said air jets.

13. A vehicle window cleaning device in combination with a vehicle having an electrical system and said vehicle having a windshield, right-side front and rear windows, left-side front and rear windows and a rear window, and said windshield, right-side front and rear windows, left-side front and rear windows and rear window having bottoms and exterior surfaces, said cleaning device comprising: electrically powered high-speed blower means, operatively connected to the vehicle's electrical system and operable at high speed without regard to whether the vehicle is stationary, idling or moving, for drawing ambient air and forcing out the ambient air at high velocity; electrically powered high-temperature heater means, electrically connected to the vehicle's electrical system and operable in conjunction with said high-speed blower means, for electrically heating to a high temperature the ambient air drawn and forced out by said blower means; combined blower-heater housing means housing said high-speed blower means and said high-temperature heater means, said housing means having, in communicative relationship therewith, air intake duct means and exhaust air duct means; said blower means drawing ambient air through said air intake duct means and into said housing means, and forcing the air at high velocity through said exhaust air duct means; air nozzle means, in communicative relationship with said exhaust air duct means, and being disposed below the bottoms of the windshield, right-side front and rear windows, left-side front and rear windows and rear window and being positioned relative to the respective exterior surfaces of the windshield, right-side front and rear windows, left-side front and rear windows and rear window, for directing and impacting the air, drawn by said blower means through said air intake duct means into said housing means and forced at high impact velocity through said exhaust air duct means and out of said air nozzle means, and directing, with high impact velocity, the forced air with tremendous force upon the entire exterior surfaces of the respective windshield, right-side front and rear windows, left-side front and rear windows and rear window to remove instantly, by blowing away, dirt, water and moisture from the entire exterior surfaces of the respective windshield, right-side front and rear windows, left-side front and rear windows and rear window and thereby cleaning, rendering clear and maintaining clear the entire exterior surfaces of the respective windshield, right-side front and rear windows, left-side front and rear windows and rear window; and said heater means, when operating in conjunction with said blower means, heating to a high temperature within said blower-heater housing means the air drawn into said housing means and so forced from said exhaust air duct means, without regard to whether the vehicle is stationary, idling or moving, such that the air, so heated to such high temperature and directed by said air nozzle means at high impact velocity upon the entire exterior surfaces of the respective windshield, right-side front and rear windows, left side front and rear windows and rear window, impacts, melts and blows away ice, ice-encrusted snow and snow from the entire exterior surfaces of the windshield, right-side front and rear windows, left-side front and rear windows and rear window, and removes, by blowing away dirt, water and moisture from the entire exterior surfaces of the respective windshield, right-side front and rear windows, left-side front and rear windows and rear window, and thereby cleans, renders clear and maintains clear the entire exterior surfaces of the respective windshield, right-side front and rear windows, left-side front and rear windows and rear window.

14. A vehicle window cleaning device in accordance with claim 13, wherein the air forced by said blower means from said exhaust air duct means ranges in velocity from 120–200 MPH.

15. A vehicle window cleaning device in accordance with claim 13, wherein the temperature of the air heated by said heater means ranges from 120°–150° F.

* * * * *